(12) United States Patent
Honda et al.

(10) Patent No.: US 7,682,739 B2
(45) Date of Patent: Mar. 23, 2010

(54) NEGATIVE ELECTRODE FOR NONAQUEOUS SECONDARY BATTERY AND PROCESS OF PRODUCING THE SAME

(75) Inventors: Hitohiko Honda, Saitama (JP); Yoshiki Sakaguchi, Saitama (JP); Kiyotaka Yasuda, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 1348 days.

(21) Appl. No.: 11/127,114

(22) Filed: May 12, 2005

(65) Prior Publication Data

US 2005/0266304 A1 Dec. 1, 2005

Related U.S. Application Data

(60) Provisional application No. 60/640,237, filed on Jan. 3, 2005.

(30) Foreign Application Priority Data

May 12, 2004 (JP) ............................. 2004-141981
Mar. 4, 2005 (JP) ............................. 2005-061280

(51) Int. Cl.
*H01M 4/02* (2006.01)
*H01M 4/58* (2006.01)
*H01M 4/82* (2006.01)

(52) U.S. Cl. ............... 429/209; 429/231.9; 429/231.95; 29/623.1; 29/623.5; 205/50

(58) Field of Classification Search ............... 429/122, 429/128, 137, 209; 29/623.1–623.5; 205/57, 205/59–60
See application file for complete search history.

(56) References Cited

U.S. PATENT DOCUMENTS 5,302,474 A * 4/1994 Shackle ...................... 429/312
2006/0115735 A1* 6/2006 Yasuda et al. ............... 429/233

FOREIGN PATENT DOCUMENTS

EP 1 617 497 12/2003

(Continued)

OTHER PUBLICATIONS

European Patent Office issued an European Search Report dated Sep. 17, 2009, Application No. 05 736 746.8.

*Primary Examiner*—Dah-Wei D Yuan
*Assistant Examiner*—Claire L Rademaker
(74) *Attorney, Agent, or Firm*—Young & Thompson

(57) ABSTRACT

A negative electrode 1 for nonaqueous secondary batteries characterized by having an active material layer 5 and a metallic lithium layer 3 both between a pair of current collecting surface layers 4. The negative electrode 1 has two negative electrode precursors 2 each composed of the current collecting surface layer 4 and the active material layer 5 on one side of the surface layer 4. The two negative electrode precursors 2 are united with their active material layers 5 facing each other and with the metallic lithium layer 3 sandwiched therebetween. A metallic material having low capability of forming a lithium compound penetrates through the whole thickness of the active material layer 5.

13 Claims, 6 Drawing Sheets

FOREIGN PATENT DOCUMENTS

| | | |
|---|---|---|
| JP | 5-144472 | 6/1993 |
| JP | 5-144473 | 6/1993 |
| JP | 7-94211 | 4/1995 |
| JP | 8-50922 | 2/1996 |
| JP | 8-124579 | 5/1996 |
| JP | 11-54112 | 2/1999 |
| JP | 2001-223030 | 8/2001 |
| JP | 2002-289178 | 10/2002 |
| JP | 2002-359006 | 12/2002 |
| JP | 2003-7305 | 1/2003 |
| WO | WO 2004095612 A1 * | 11/2004 |
| WO | 2005/027692 | 6/2005 |

* cited by examiner

NEGATIVE ELECTRODE FOR NONAQUEOUS SECONDARY BATTERY AND PROCESS OF PRODUCING THE SAME

TECHNICAL FIELD

The present invention relates to a negative electrode for nonaqueous secondary batteries such as lithium ion secondary batteries and a process of producing the negative electrode.

BACKGROUND ART

Attaching metallic lithium to the negative electrode of a nonaqueous secondary battery has been proposed to obtain improved overdischarge characteristics. For example, JP-A-5-144472, JP-A-5-144473, and JP-A-7-94211 disclose a nonaqueous secondary battery consisting of a spiral wound roll of a positive plate of a lithium-containing complex oxide of a transition metal and a negative plate of a carbon material separated by a separator, in which the negative electrode has a metallic lithium foil adhered to its outermost or peripheral part on the side not facing the positive plate.

The disclosed negative electrode has the active material exposed on its outermost surface that is in contact with a nonaqueous electrolyte. Therefore, the active material particles are apt to fall off through repetition of expansion and contraction accompanying intercalation and deintercalation of lithium ions. As a result, a battery using the negative electrode tends to have a reduced cycle life. Moreover, since metallic lithium is also exposed on the outermost surface of the negative electrode, there is the danger that lithium grows dendritically, and the formed dendrites ultimately fall off the negative electrode or penetrate the separator and then contact with the positive electrode, which causes an internal shortage or ignition.

A trace amount of water can often enter a nonaqueous secondary battery during the production processes. In a nonaqueous secondary battery, water reacts with the nonaqueous electrolyte to decompose it. It has hence been suggested to reduce the water content of a nonaqueous secondary battery thereby to improve charge/discharge cycle characteristics (see JP-A-2001-223030). However, a good deal of time and effort would be involved to reduce the water content to a satisfactory level, which is not economically feasible.

Apart from water, a trace amount of oxygen is unavoidably present in the current collector and the active material. Oxygen forms a compound with lithium during a charge or discharge. Formation of the lithium compound results in a reduction in the amount of reversibly available lithium, namely, an increase of irreversible capacity, because an Li—O bond has a relatively high bonding strength.

DISCLOSURE OF THE INVENTION

An object of the present invention is to provide a negative electrode for nonaqueous secondary batteries which is freed from various disadvantages associated with the above-mentioned related art.

The object of the invention is accomplished by providing a negative electrode for a nonaqueous secondary battery comprising a pair of current collecting surface layers, an active material layer, and a metallic lithium layer. The active material layer and the metallic lithium layer are interposed between the current collecting surface layers.

The present invention also provides a preferred process of producing the above-described negative electrode. The process includes the steps of forming a current collecting surface layer on a carrier foil by electroplating, forming an active material layer on the current collecting surface layer to make a negative electrode precursor having the current collecting surface layer and the active material layer on the carrier foil in this order, uniting the two negative electrode precursors with the active material layers of the negative electrode precursors facing each other and with a metallic lithium foil inserted between the negative electrode precursors and removing the carrier foils from the respective negative electrode precursors.

The present invention also provides a negative electrode comprising a pair of current collecting surface layers comprising a metallic material having low capability of forming a lithium compound and an active material layer between the current collecting surface layers. At least one of the current collecting surface layers has a number of micropores open on the surface thereof, extending in the thickness direction thereof, and allowing a nonaqueous electrolyte to penetrate therethrough. The active material layer contains a particulate active material which has high capability of forming a lithium compound and in which lithium is intercalated. The active material layer has a metallic material having low capability of forming a lithium compound penetrating through the whole thickness thereof. The negative electrode has no electro-conductive metal foil layer as a core.

The present invention also provides a preferred process of producing the above-described negative electrode. The process includes the steps of forming a current collecting surface layer on a carrier foil by electroplating, forming an active material layer on the current collecting surface layer by applying an electro-conductive slurry containing a particulate active material to make a negative electrode precursor having the current collecting surface layer and the active material layer on the carrier foil in this order, uniting the two negative electrode precursors with the active material layers of the negative electrode precursors facing each other and with a metallic lithium foil inserted between the negative electrode precursors to give a unitary structure, heating the unitary structure to a temperature sufficient for lithium to thermally diffuse so as to cause lithium of the metallic lithium foil to diffuse into the active material layers, and removing the carrier foils from the respective negative electrode precursors.

BEST MODE FOR CARRYING OUT THE INVENTION

Figure 1:
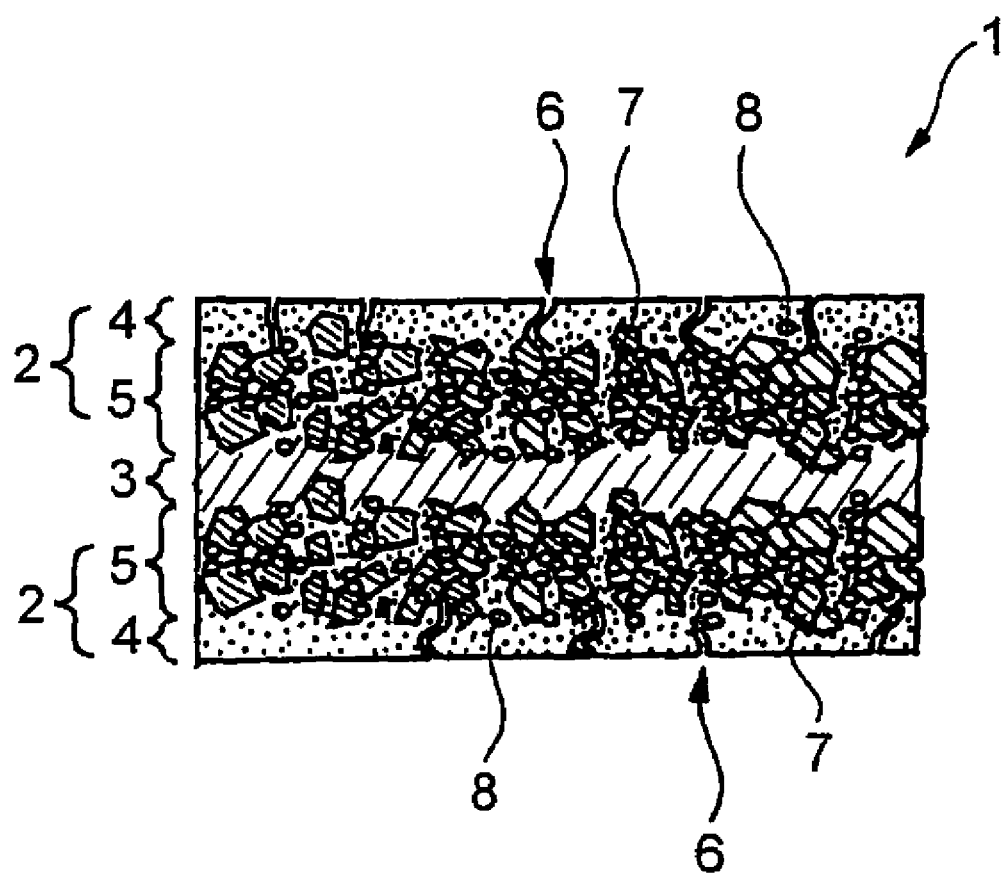
FIG. 1 schematically illustrates the structure of an embodiment of the negative electrode according to the present invention.

The present invention will be described based on its preferred embodiments with reference to the accompanying drawings. FIG. 1 is a schematic illustration showing the structure of an embodiment of the negative electrode according to the present invention. The negative electrode 1 of this first embodiment basically has two negative electrode precursors 2 and a metallic lithium layer 3. The metallic lithium layer 3 is interposed between the negative electrode precursors 2.

The negative electrode precursors each have a current collecting surface layer 4 and an active material layer 5 disposed on one side of the current collecting surface layer 4. As shown in FIG. 1, the metallic lithium layer 3 is disposed between the negative electrode precursors 2 such that the active materials layers 5 of the negative electrode precursors 2 face each other while the current collecting surface layers 4 face outward. As is understood from FIG. 1, the negative electrode 1 does not have a thick conductor for current collection, which is called a current collector and has hitherto been used in negative electrodes, such as a metal foil or expanded metal with a thickness of about 8 to 35 µm.

The current collecting surface layers 4 perform a current collecting function. The current collecting surface layers 4 also serve to prevent the active material of the active material layer 5 from falling off due to volumetric expansion and contraction, accompanying lithium intercalation and deintercalation of the active material. The current collecting surface layer 4 is preferably made of a metal capable of functioning as a current collector of a nonaqueous secondary battery, particularly of a lithium secondary battery. Such a metal includes those having low capability of forming a lithium compound, such as copper, nickel, iron, cobalt, and alloys of these metals. Of these metals particularly preferred are copper, nickel and their alloys. Nickel is preferred for enhancing the strength of the negative electrode 1. The two current collecting surface layers 4 can be made of the same or different materials. The expression "low capability of forming a lithium compound" as used herein, means no capability of forming an intermetallic compound or solid solution with lithium or, if any, the capability is such that the resulting lithium compound is of very small amount or is very labile.

Each current collecting surface layer 4 is thinner than the thick conductor film that has been used for current collection in conventional electrodes. Specifically, it is preferably as thin as about 0.3 to 10 µm, more preferably about 1 to 5 µm. With this minimum thickness necessary, the active material layer 5 can be covered substantially completely and continuously. The active material that has pulverized through repetition of charging and discharging can thus be prevented from falling off. The current collecting surface layers 4 with the above-recited small thickness are preferably formed by electroplating as described later. The two current collecting surface layers 4 may be equal or different in thickness.

Each of the current collecting surface layers has a great number of micropores 6 open on the surface thereof and leading to the active material layer 5. The micropores 6 are formed in each current collecting surface layer 4, extending in the thickness direction of the surface layer 4. These micropores 6 allow a nonaqueous electrolyte to sufficiently penetrate the active material layer 5 and to sufficiently react with the active material. The micropores 6 are very small as having a width of about 0.1 µm to about 10 µm as observed on a cut section of the current collecting surface layer 4. The micropores 6 are so fine and yet wide enough to allow a nonaqueous electrolyte to penetrate. A nonaqueous electrolyte has a smaller surface tension than an aqueous one so that it is capable of penetrating sufficiently through the micropores 6 with such a small width. The micropores 6 are preferably formed simultaneously with electroplating to form the current collecting surface layer 4. While, in the present embodiment, both the two current collecting surface layers 4 have the micropores 6, desired effects can be produced if the micropores 6 are formed in at least one of the two current collecting surface layers 4.

When the current collecting surface layer 4 having the micropores 6 is observed from above through an electron microscope, the micropores 6 have an average open area of about 0.1 to 50 µm$^2$, preferably about 0.1 to 20 µm$^2$, more preferably about 0.5 to 10 µm$^2$. Within this range of open area, the active material is effectively prevented from falling off, while securing sufficient penetration of a nonaqueous electrolyte, and improved charge and discharge capacities can be obtained from the initial stage of charge/discharge cycles. To prevent fall-off of the active material which is particulate more effectively, the average open area of the micropores 6 is preferably 0.1 to 50%, more preferably 0.1 to 20%, of the maximum cross-sectional area of the active material particles. The term "maximum cross-sectional area of the active material particles" denotes a maximum cross-sectional area of a hypothetical sphere, having a diameter corresponding to the median particle diameter ($D_{50}$) of the active material particles.

When the surface of the current collecting surface layer 4 having the micropores 6 is observed under an electron microscope, the ratio of the total open area of the micropores 6 in the visual field to the area of the visual field (i.e., the open area ratio) is 0.1 to 20%, preferably 0.5 to 10%. The reason for this is the same as for specifying the range of the open area of the micropores 6. For the same reason, it is preferable that current collecting surface layer 4 having the micropores 6 have 1 to 20,000, more preferably 10 to 1,000, even more preferably 50 to 500, micropores 6 in every 100 µm-side square in the visual field under an electron microscope.

The active material layer 5 positioned just inside each of the current collecting surface layers 4 contains an active material having high capability of forming a lithium compound. Such an active material includes silicon materials, tin materials, aluminum materials, and germanium materials. Covered with the current collecting surface layers 4, the active material is effectively prevented from falling off as a result of its lithium ion intercalation and deintercalation. Since the active material can meet the electrolyte coming through the micropores 6, they are not hindered from electrode reaction.

The active material layer 5 is formed by applying an electro-conductive slurry containing active material particles 7 shown, e.g., in FIG. 1. A gas deposition method may be used instead of the slurry application method. The gas deposition method is carried out by mixing active material particles (Si, etc.) with a carrier gas (e.g., nitrogen or argon) in a vacuum chamber to form an aerosol flow, which is ejected from a nozzle onto a substrate (e.g., a current collecting foil) to deposit a film on the substrate. Allowing of layer formation at ambient temperature, the gas deposition method provides a coating layer with less change in composition, even in using multi-component active material particles as compared with various thin film formation techniques described below. The gas deposition method also provides an active material layer, having a large number of voids, by adjusting aerosol ejecting conditions, such as the particle size of the active material and the gas pressure. The active material layer 5 may also be a thin film of an active material formed by various thin film formation techniques including chemical vapor deposition (CVD), physical vapor deposition (PVD), sputtering, and electroplating.

Where the active material layer 5 is a particulate layer containing active material particles 7, the particles 7 include (a) particles of pure silicon or pure tin, (b) mixed particles containing at least silicon or tin and carbon, (c) mixed particles of silicon or tin and a metal, (d) particles of a compound containing silicon or tin and a metal, (e) mixtures of particles of a compound containing silicon or tin and a metal and metal particles, (f) pure silicon or pure tin particles coated with a metal, and (g) particles containing the above-recited particles in their oxide form. Compared with the particles (a) (i.e., particles of pure silicon or pure tin), use of the particles (b) to (f) is advantageous in that pulverization of the silicon material due to lithium intercalation and deintercalation is suppressed more and that poor electron conductivity of silicon, which is semiconductive, can be compensated for.

The active material particles 7 preferably have a maximum particle size of 50 µm or smaller, still preferably 20 µm or smaller. The particle size, represented in terms of $D_{50}$ value, of the particles 7 is preferably 0.1 to 8 µm, still preferably 1 to 5 µm. Where the maximum particle size exceeds 50 µm, the particles 7 are liable to fall off, resulting in reduction of electrode life. The lower limit of the particle size is not particularly specified. The smaller, the better. In light of the process of making the particles 7, the lower limit would be about 0.01 µm. The particle size of the particles 7 can be measured with a particle size distribution measuring device, using a laser diffraction scattering method, or under electron microscopic observation.

There is a tendency that too small a proportion of the active material in the negative electrode 1 makes it difficult to sufficiently improve battery energy density. On the other hand, the active material, if used too much, tends to fall off. Taking these tendencies into consideration, the amount of the active material is preferably 5% to 80% by weight, still preferably 10% to 50% by weight, particularly preferably 20% to 50% by weight, based on the total weight of the negative electrode 1. The thickness of the active material layer 5 is subject to adjustment in accordance with the proportion of the active material to the whole negative electrode and the like. While not critical in the present embodiment, it is usually about 1 to 100 µm, preferably about 3 to 40 µm, where the active material layer 5 contains the active material particles 7.

Where the active material layer 5 contains the active material particles 7, it is preferred that the active material layer 5 be penetrated with a metallic material having low capability of forming a lithium compound throughout its whole thickness and that the active material particles 7 be present in the penetrating material. That is, it is preferred that the active material particles 7 be not substantially exposed on the outer surfaces of the negative electrode 1 and be embedded in the inner side of the current collecting surface layers 4. In that preferred state, the active material layer 5 and the current collecting surface layer 4 are firmly united, and fall-off of the active material is better prevented. Furthermore, since the penetrating material in the active material layer 5 secures electron conductivity between the current collecting surface layer 4 and the active material, the active material is effectively prevented from being electrically isolated in parts, especially in the depth of the active material layers 5. The current collecting function is thus maintained. As a result, reduction in function as a negative electrode is suppressed, and the life of the negative electrode is prolonged. This is particularly advantageous in using, as an active material, a material that is semi-conductive and poor in electron conductivity, such as a silicon material.

The metallic material with low capability of forming a lithium compound that penetrates over the whole thickness of the active material layer 5 is preferably of the same kind as the metallic material making the current collecting surface layer 4. A metallic material different from the one making the current collecting surface layer 4 may be used provided that it has low capability of forming a lithium compound.

It is preferred that the metallic material having low capability of forming a lithium compound, penetrate the thickness of the active material layer 5. In this case, the two current collecting surface layers 4 are electrically connected via the penetrating metallic material and the metallic lithium layer 3, and the negative electrode 1 exhibits enhanced electron conductivity as a whole. That is, the negative electrode 1 of the present embodiment performs current collecting function as a whole. The fact that the metallic material having low capability of forming a lithium compound penetrates the whole thickness of the active material layer 5 can be confirmed by mapping the material using an electron microscope. A preferred method for penetrating the metallic material having low capability of forming a lithium compound into the active material layer 5 will be described later.

The active material layer 5 preferably contains particles 8 of an electro-conductive carbon material, or metallic material in addition to the active material particles 7 to give further improved electron conductivity to the negative electrode 1. From this viewpoint, the amount of the electro-conductive carbon or metallic material particles 8 is preferably 0.1% to 20% by weight, still preferably 1% to 10% by weight, based on the weight of the active material layer 5. The electro-conductive carbon material includes acetylene black and graphite. To ensure the improvement on electron conductivity, it is preferred for the electro-conductive particles to have a particle size of 40 µm or smaller, still preferably 20 µm or smaller. The lower limit of the particle size is not critical, which means the smaller, the better. In the light of the process of making the particles, the lower limit would be about 0.01 µm.

The metallic lithium layer 3 interposed between two active material layers 5 makes up a local cell with the active material (negative electrode active material) in the presence of a non-aqueous electrolyte. It follows that metallic lithium from the metallic lithium layer 3 is electrochemically intercalated into the nearby active material or, otherwise, lithium is intercalated into the active material as a result of lithium concentration gradient. In this way, the metallic lithium layer 3 acts as a lithium supply source. As a result, even though lithium is consumed with charges and discharges, lithium is supplied from the lithium layer 3. This eliminates what we call the lithium depletion problem. The cycle characteristics of the negative electrode 1 can thus be improved. Moreover, even if the elements constituting a battery, such as the positive electrode and the electrolyte as well as the negative electrode 1, contain a trace amount of water, the metallic lithium reacts with the water to decrease the water content of the battery. A trace amount of oxygen unavoidably present in the current collector and the active material is also trapped by the metallic lithium. Thus, the metallic lithium layer 3 reduces the initial irreversible capacity and brings about improved charge/discharge efficiency in every charge/discharge cycle (i.e., cycle characteristics). Since the metallic lithium layer 3 is not exposed on the surface but buried inside the negative electrode 1, and lithium is to be intercalated into the active material, there is no fear that lithium grows dendritically and can cause an internal shortage or ignition. Further, after dissolution of lithium, spaces are left in the metallic lithium layer 3 and these spaces accommodate the stress due to the expansion and contraction of the active material during charging and discharging process, which provides such an advantage that pulverization of the active materials can be prevented.

For obtaining satisfactory capability of restoring the capacity, the amount of the metallic lithium is preferably 0.1% to 50%, still preferably 5% to 50%, particularly preferably 10% to 40%, especially preferably 20% to 40%, of the theoretical initial charge capacity of the negative electrode active material. For example, when silicon is used as a negative electrode active material, silicon is theoretically capable of intercalating lithium until it takes on a state represented by chemical formula: $SiLi_{4.4}$. Accordingly, when the amount of lithium intercalated is 100% of the theoretical initial charge capacity of silicon, lithium is intercalated into silicon until silicon takes on a state represented by $SiLi_{4.4}$.

The total thickness of the negative electrode 1 having the above-described structure is preferably about 2 to 50 μm, still preferably about 10 to 50 μm, for securing physical strength and increasing the energy density of the negative electrode 1.

Figure 2:
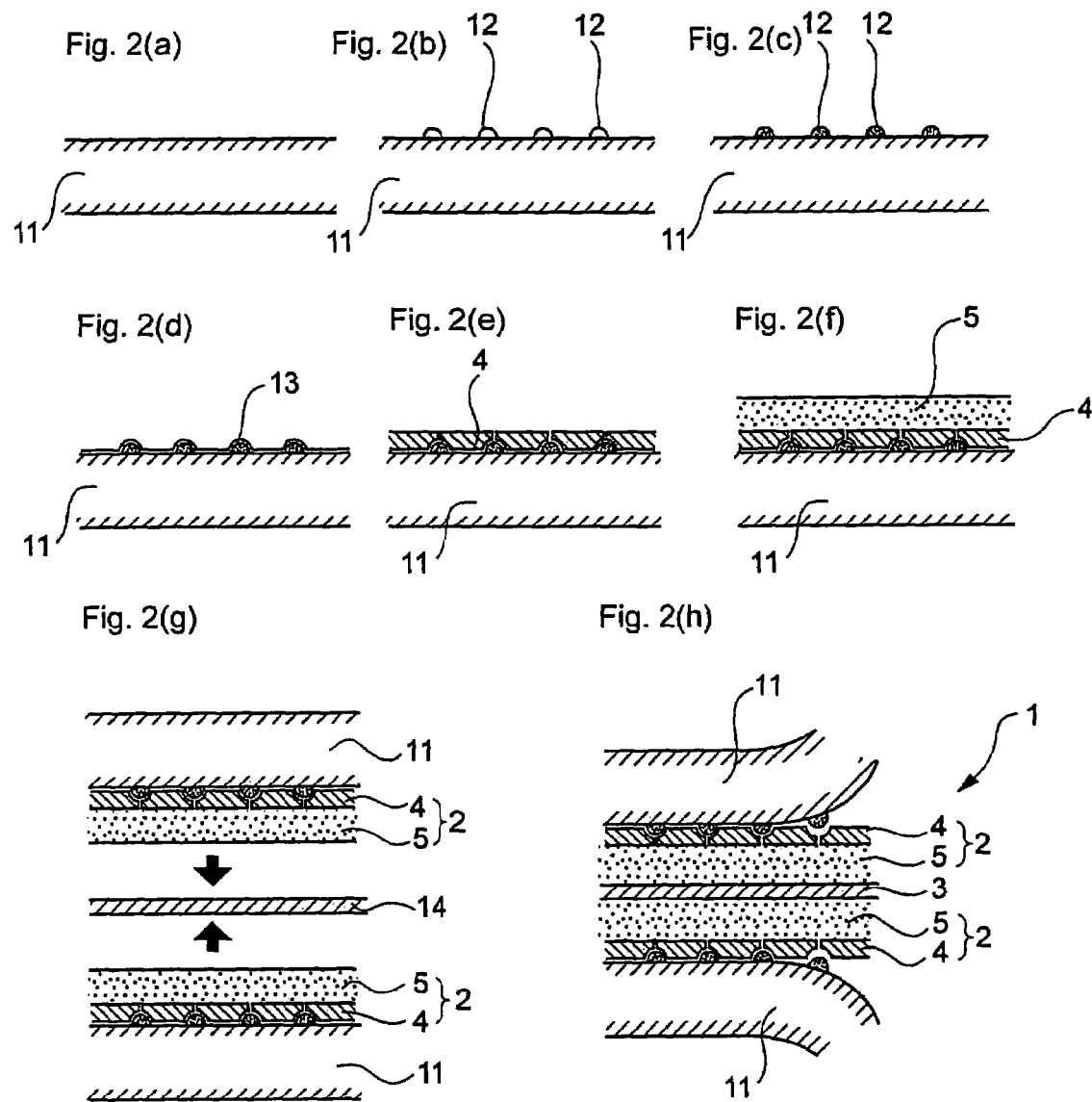
FIG. 2(a), FIG. 2(b), FIG. 2(c), FIG. 2(d), FIG. 2(e), FIG. 2(f), FIG. 2(g), and FIG. 2(h) show steps included in a process for producing the negative electrode of FIG. 1.

A preferred process for producing the negative electrode 1 shown in FIG. 1 will be described with reference to FIG. 2. Negative electrode precursors 2 are the first to be made. To make the negative electrode precursor 2, a carrier foil 11 is prepared as shown in FIG. 2(*a*). The carrier foil 11 is not particularly limited in material but is preferably electro-conductive. The carrier foil 11 does not need to be of metal as long as it is electro-conductive. Nevertheless, use of a metal-made foil as the carrier foil 11 is advantageous in that the carrier foil 11 separated after making a negative electrode precursor 2 can be melted and recycled into foil. Taking recyclability into consideration, the carrier foil 11 is preferably of the same material as a current collecting surface layer 4 formed by electroplating (described infra). Seeing that the carrier foil 11 is used as a support for making a negative electrode precursor 2, it is desirable for the carrier foil 11 to have sufficient strength not to bunch up or wrinkle in the production steps. Accordingly, the carrier foil 11 preferably has a thickness of about 10 to 50 μm.

The carrier foil 11 can be prepared by, for example, electrolysis or rolling. Rolling provides a carrier foil 11 with small surface roughness. Where the carrier foil 11 is prepared by electrolysis, steps from the making of the carrier foil 11 to the making of the negative electrode precursor 2 can be effected in the same line, which is advantageous from the standpoint of stable production of the negative electrode precursors 2 and reduction of production cost. In preparing the carrier foil 11 by electrolysis, the electrolysis is carried out using a rotating drum as a cathode in an electrolytic bath containing metal (e.g., copper or nickel) ions to deposit the metal on the peripheral surface of the drum. The deposited metal is peeled from the drum to obtain the carrier foil 11.

Prior to the formation of a current collecting surface layer 4, the resulting carrier foil 11 is provided on one side thereof with a thin, filmy coat 12 made of a material different from the material making the current collecting surface layer 4 as shown in FIG. 2(*b*). The current collecting surface layer 4 is then deposited thereon by electroplating. By this operation, the density and the open area of the micropores 6 formed in the current collecting surface layer 4 can easily be controlled.

The coat 12 is used to make the carrier foil surface, on which the current collecting surface layer 4 is to be formed, non-uniform in electron conductivity thereby to form a large number of micropores in the current collecting surface layer 4. The coat 12 is preferably applied to a thickness of 0.001 to 1 μm, still preferably 0.002 to 0.5 μm, particularly preferably 0.005 to 0.2 μm. Applied to such a small thickness, the coat 12 covers the surface of the carrier foil discontinuously, for example in the form of islands.

The coat 12 is made of a material different from the material building up the current collecting surface layer 4, whereby the surface layer 4 can successfully be peeled from the carrier foil 11 in the step of peeling hereinafter described. The coat 12 is preferably made of a material which is different from the material making the current collecting surface layer 4 and contains at least one element of Cu, Ni, Co, Mn, Fe, Cr, Sn, Zn, In, Ag, Au, C, Al, Si, Ti, and Pd.

The method of forming the coat 12 is not particularly restricted. For example, the method of forming the coat 12 is selected in relation to the method of forming the current collecting surface layer 4. More specifically, where the current collecting surface layer 4 is to be formed by electroplating, it is preferred to form the coat 12 by electroplating as well, from the standpoint of production efficiency and the like. The coat 12 can also be formed by other processes, such as electroless plating, sputtering, physical vapor deposition, chemical vapor deposition, a sol-gel process and ion plating.

Where the coat 12 is formed by electroplating, a proper plating bath and proper plating conditions are selected according to the constituent material of the coat 12. For example, in making the coat 12 of tin, a plating bath having the composition shown below or a tin borofluoride bath can be used. In using these plating baths, the bath temperature is preferably about 15° to 30° C., and the current density is preferably about 0.5 to 10 A/dm$^2$.

Plating Bath Composition:

| | |
|---|---|
| SnSO$_4$ | 30 to 70 g/l |
| H$_2$SO$_4$ | 60 to 150 g/l |
| Cresolsulfonic acid | 70 to 100 g/l |

As stated above, the coat 12 is used to provide the surface on which the current collecting surface layer 4 is to be formed with non-uniform electron conductivity. When the material making the coat 12 is largely different from the carrier foil 11 in electron conductivity, application of the coat 12 immediately creates electron conductivity non-uniformity on the surface on which to form the surface layer 4. Use of carbon as a material of the coat 12 is exemplary of that case. On the other hand, when using, as a material making the coat 12, a material whose electron conductivity is about the same as that of the carrier foil 11, such as various metallic materials, e.g., tin, application of the coat 12 does not immediately result in non-uniform electron conductivity of the surface for forming the current collecting surface layer 4. Then, in a case where the coat 12 is made of such a material, it is preferred that the carrier foil 11 having the coat 12 formed thereon be exposed to an oxygen-containing atmosphere, such as the air, in a dry condition, thereby to oxidize the surface of the coat 12 (and the exposed area of the carrier foil 11) (see FIG. 2(*c*)). By this operation, the electron conductivity on the surface for forming the current collecting surface layer 4 becomes non-uniform. When electroplating (described infra) is performed on the surface with the thus created electron conductivity non-uniformity, there is produced a difference in electrodeposition rate between the surface of the coat 12 and the exposed area of the carrier foil 11. It follows that the micropores 6 can easily be formed in the surface layer 4. The degree of oxidation is not critical in the present invention. According to the present inventors' study, it has been confirmed that leaving the carrier foil 11 having the coat 12 formed thereon in the atmosphere for about 10 to 30 minutes, for example, is sufficient. The carrier foil 11 having the coat 12 formed thereon may be forcibly oxidized, nevertheless.

The reason why the carrier foil 11 having the coat 12 formed thereon is in a dry condition when it is exposed to an oxygen-containing atmosphere is for the sake of oxidation efficiency. Where the coat 12 is formed by electroplating, for example, such an operation is effected by drying the carrier foil 11 taken out of the plating bath by means of a dryer, etc. and then allowing it to stand in the atmosphere for a given time. Where the coat 12 is formed by dry processes, such as sputtering and various vacuum deposition techniques, the drying operation is unnecessary, and the foil 11 with the coat 12 thereon is allowed to stand in the atmosphere as it is.

Oxidation of the coat 12 is followed by applying a release agent 13 thereon as shown in FIG. 2(d). The release agent 13 is provided for the purpose of successfully separating a negative electrode precursor 2 from the carrier foil 11 in the step of peeling described infra. Organic compounds, particularly nitrogen-containing compounds or sulfur-containing compounds, are preferably used as a release agent 13. The nitrogen-containing compounds preferably include triazole compounds, such as benzotriazole (BTA), carboxybenzotriazole (CBTA), tolyltriazole (TTA), N',N'-bis(benzotriazolylmethyl)urea (BTD-U), and 3-amino-1H-1,2,4-triazole (ATA). The sulfur-containing compounds include mercaptobenzothiazole (MBT), thiocyanuric acid (TCA), and 2-benzimidazolethiol (BIT). The purpose of applying a release agent 13 is just to facilitate peeling the formed negative electrode precursor 2 off the carrier foil 11 in the step of peeling. Therefore, a current collecting surface layer 4 with a large number of micropores 6 can be formed even if the step of applying a release agent is omitted.

A current collecting surface layer 4 is then deposited on the layer thus formed with the release agent 13 applied thereon, by electroplating with a material constituting the current collecting surface layer 4 as shown in FIG. 2(e). The resulting current collecting surface layer 4 has a great number of micropores 6 at the above-recited density with the above-recited diameter. While FIG. 2(e) shows that the micropores 6 are positioned on the top of the islands forming the coat 12, the aim of this depiction is only for the sake of convenience. In fact, the micropores 6 are not always formed at positions on the top of the coat 12. The plating bath and plating conditions are chosen appropriately, according to the material of the current collecting surface layer 4. In making the surface layer 4 of Ni, for instance, a Watts bath having the composition shown below or a sulfamic acid bath can be used as a plating bath. In using these baths, the bath temperature is preferably about 40° to 70° C., and the current density is preferably about 0.5 to 20 A/dm$^2$.

Watts Bath Composition:

| | |
|---|---|
| NiSO$_4$•6H$_2$O | 150 to 300 g/l |
| NiCl$_2$•6H$_2$O | 30 to 60 g/l |
| H$_3$BO$_3$ | 30 to 40 g/l |

Subsequently, an electro-conductive slurry containing active material particles is applied to the current collecting surface layer 4 to form an active material layer 5 as shown in FIG. 2(f). The slurry contains active material particles, particles of an electro-conductive carbon material or an electro-conductive metallic material, a binder, a diluting solvent, and so forth. Useful binders include polyvinylidene fluoride (PVDF), polyethylene (PE), and ethylene-propylene-diene monomer (EPDM). Useful diluting solvents include N-methylpyrrolidone and cyclohexane. The amount of the active material particles in the slurry is preferably about 14% to 40% by weight. The amount of the electro-conductive carbon material or electro-conductive metallic material is preferably about 0.4% to 4% by weight. The amount of the binder is preferably about 0.4% to 4% by weight. The slurry is prepared by adding a diluting solvent to a mix of these components. As previously described, application of a slurry may be replaced with a gas deposition method to form the active material layer. The gas deposition method allows for solventless formation of the active material layer so that a subsequent drying step is unnecessary. The step of drying can oxidize the active material particles and affect the binder and the diluting solvent. Accordingly, the gas deposition method involving no drying is a favorable technique that minimizes the influences on the negative electrode performance.

After the coating layer of the slurry dries to provide the active material layer 5, the carrier foil 11, having the active material layer 5 formed thereon, is immersed in a plating bath containing a metallic material having low capability of forming a lithium compound to carry out electroplating. On putting the active material layer 5 in the plating bath, the plating solution penetrates the active material layer 5 and reaches the interface between the active material layer 5 and the current collecting surface layer 4. Electroplating is effected in that state. As a result, the metallic material having low capability of forming a lithium compound is deposited in (a) the inside of the active material layer 5 and (b) the inner surface side of the active material layer 5 (i.e., the side facing the current collecting surface layer 4). The metallic material is thus distributed throughout the thickness of the active material layer 5 to make a negative electrode precursor 2 on the carrier foil 11.

The following is recommended electroplating conditions, taking copper, for instance, as a metallic material having low capability of forming a lithium compound. In using a copper sulfate-based solution, electroplating is performed at a copper concentration of 30 to 100 g/l, a sulfuric acid concentration of 50 to 200 g/l, a chlorine concentration of 30 ppm or less, a bath temperature of 30° to 80° C., and a current density of 1 to 100 A/dm$^2$. In using a copper pyrophosphate-based solution, electroplating is conducted at a copper concentration of 2 to 50 g/l, a potassium pyrophosphate concentration of 100 to 700 g/l, a bath temperature of 30° to 60° C., a pH of 8 to 12, and a current density of 1 to 10 A/dm$^2$. By controlling these electrolysis conditions properly, the metallic material penetrates the whole thickness of the active material layer 5.

In this way, there is obtained a negative electrode precursor 2 having the current collecting surface layer 4 and the active material layer 5 formed in this order on the carrier foil 11. Two negative electrode precursors 2 thus obtained are used as paired members. As illustrated in FIG. 2(g), the paired negative electrode precursors 2 are disposed with their active material layers 5 facing each other, a metallic lithium foil 14 is inserted between the paired negative electrode precursors 2, and the metallic lithium foil 14 and the paired negative electrode precursors 2 are united together. The metallic lithium foil 14 and the paired negative electrode precursors 2 can be united merely by superimposing them on top of one another and pressing. Where enhanced interlaminar strength is desired, the three members may be united using an electro-conductive adhesive such as electro-conductive paste.

Finally, the negative electrode precursors 2 are peeled apart from the respective carrier foils 11 at the interface between the current collecting surface layers 4 and the respective carrier foils 11 to give a desired negative electrode 1.

The thus obtained negative electrode according to this embodiment of the invention is assembled into a nonaqueous secondary battery together with a known positive electrode, separator and nonaqueous electrolyte. A positive electrode is produced as follows: A positive electrode active material and, if necessary, an electro-conductive material and a binder are suspended in an appropriate solvent to prepare a positive electrode active material mixture, which is applied to a current collector, dried, rolled, and pressed, followed by cutting and punching. Conventionally known positive electrode active materials can be used, including lithium-nickel composite oxide, lithium-manganese composite oxide, and lithium-cobalt composite oxide. Preferred separators include nonwoven fabric of synthetic resins and a porous film of polyethylene or polypropylene. The nonaqueous electrolyte used in a lithium secondary battery, for instance, is a solution of a lithium salt, which is a supporting electrolyte, in an organic solvent. The lithium salt includes $LiClO_4$, $LiAlCl_4$, $LiPF_6$, $LiAsF_6$, $LiSbF_6$, $LiSCN$, $LiCl$, $LiBr$, $LiI$, $LiCF_3SO_3$, and $LiC_4F_9SO_3$.

Second to fifth embodiments of the present invention are then described by referring to FIGS. 3 through 6. With respect to the particulars of the second to fifth embodiments that are not referred to hereunder, the description relating to the negative electrode 1 shown in FIG. 1 shall be applied appropriately.

Figure 3:
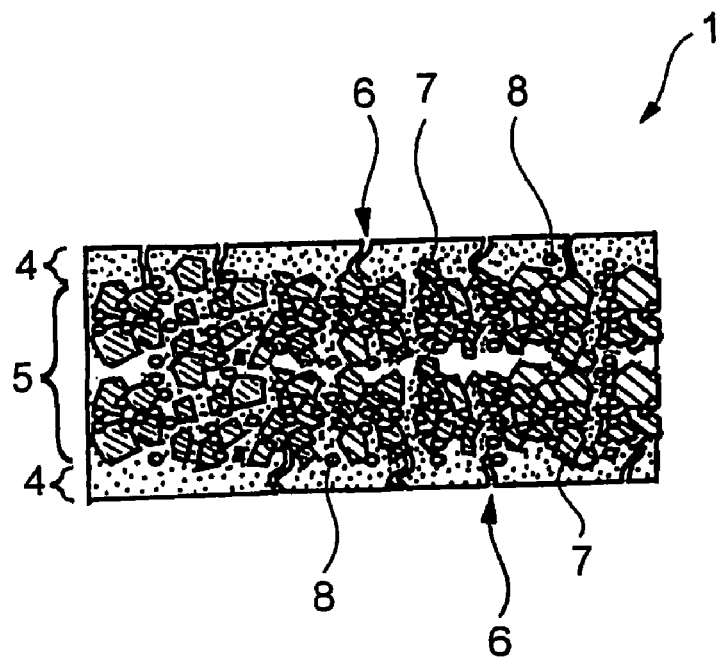
FIG. 3 schematically illustrates the structure of a second embodiment of the negative electrode according to the present invention.

The negative electrode 1 shown in FIG. 3 is obtained in the same manner as for the one shown in FIG. 1, i.e., through the steps shown in FIGS. 2(a) through (h), except that the unitary laminate obtained in the step of uniting shown in FIG. 2(g) is heated to a prescribed temperature to cause lithium to thermally diffuse from the metallic lithium foil 14 into the active material particles. The heating temperature is such that lithium is allowed to diffuse thermally, specifically 30° to 160° C., preferably 60° to 150° C.

In the negative electrode 1 thus obtained, the active material particles have lithium sufficiently intercalated therein before the start of charging. Therefore, volumetric expansion of the negative electrode 1 of FIG. 3 accompanying lithium intercalation during charging is still smaller than that experienced by the negative electrode 1 of FIG. 1. Furthermore, lithium intercalation by the active material particles leaves larger voids in the metallic lithium foil 14 (see FIG. 2(g)) than in the negative electrode 1 of FIG. 1. As a result, the stress arising from the expansion and contraction of the active material particles is more relaxed.

For the sake of convenience, FIG. 3 depicts the negative electrode 1 as if there remains no metallic lithium foil 14 (see FIG. 2(g)), i.e., as if the metallic lithium foil 14 has been entirely intercalated into the active material particles 7. In fact, the metallic lithium foil may partly remain in the negative electrode 1. Even this being the case, a negative electrode having desired performance properties can be obtained. Whether the metallic lithium foil remains in the negative electrode 1 depends on the quantitative relation between the metallic lithium foil and the active material and the temperature and time of thermal diffusion. Even if part of the metallic lithium foil remains in the negative electrode 1, the residual lithium decreases gradually by consumption through repetition of charge and discharge cycles.

Figure 4:
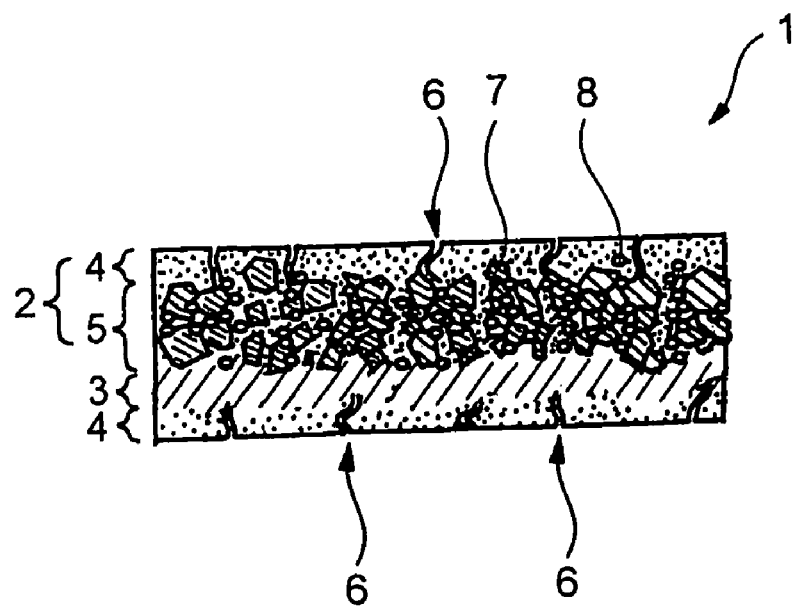
FIG. 4 schematically illustrates the structure of a third embodiment of the negative electrode according to the present invention.

The negative electrode 1 shown in FIG. 4 has one active material layer 5 and one metallic lithium layer 3 between a pair of current collecting surface layers 4. The negative electrode 1 of this embodiment corresponds to the negative electrode 1 shown in FIG. 1, wherein a metallic lithium layer 3 is interposed in between two active material layers 5, with only one of the active material layers 5 being used.

Figure 5:
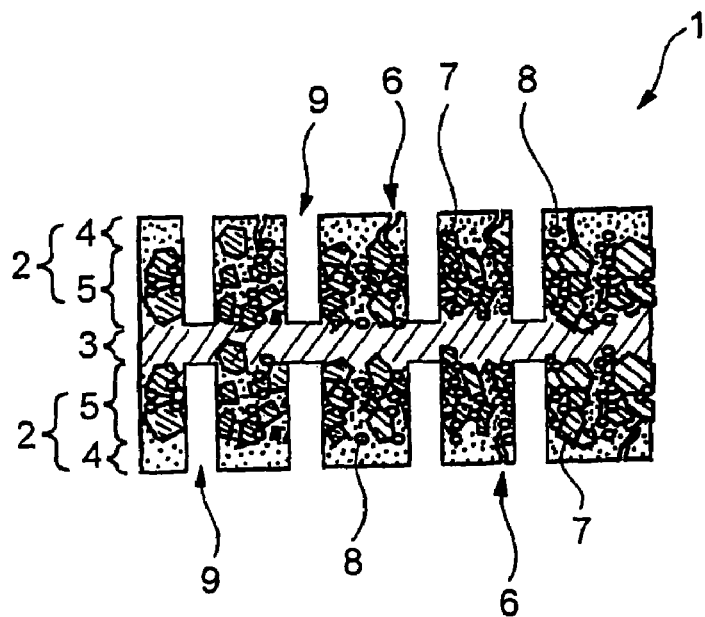
FIG. 5 schematically illustrates the structure of a fourth embodiment of the negative electrode according to the present invention.

The negative electrode 1 shown in FIG. 5 is the same as that of the embodiment shown in FIG. 1, except for having a large number of holes 9 formed therein. The individual holes 9 are open on each side of the negative electrode 1 and extend through the thicknesses of the active material layers 5 and the current collecting surface layers 4. The active material layers 5 are exposed on the inner wall of the holes 9. The holes 9 perform the following two main functions:

One of the functions is to supply the electrolyte to the inside of the active material layer 5 through the surface of the active material layer 5 exposed on the inner wall of the holes 9. Where the negative electrode 1 has the holes 9, the current collecting surface layers 4 do not need to have the aforementioned micropores 6. Although the active material layer 5 is exposed on the inner wall of the holes 9, the active material particles 7 are prevented from falling off since the metallic material having low capability of forming a lithium compound has penetrated among the particles 7.

The second function is to relax the stress resulting from volumetric change of the active material particles 7 in the active material layer accompanying charges and discharges. The stress develops chiefly in the planar direction of the negative electrode 1. Therefore, even when the active material particles 7 increase in volume during charging to cause stress, the stress is absorbed by the vacancy of the holes 9. As a result, pronounced deformation of the negative electrode 2 is effectively prevented.

The holes 9 additionally serve to externally release gas generated in the negative electrode. In some detail, gases such as $H_2$, $CO$, and $CO_2$ can be generated by the action of a trace amount of water present in the negative electrode. Accumulation of these gases in the negative electrode results in greater polarization to cause charge/discharge losses. The holes 9 let the gases out of the negative electrode 1 and thereby reduce the polarization due to the gases. The holes 9 still additionally serve for heat dissipation of the negative electrode. In more detail, the holes 9 bring about an increased specific surface area of the negative electrode so that the heat generated with lithium intercalation is efficiently released out of the negative electrode. Furthermore, the stress due to the volumetric change of the active material particles can cause heat generation. The stress relaxation by the holes 9 is effective in reducing heat generation per se.

To assure sufficient supply of the electrolyte into the active material layer and to achieve effective relaxation of the stress due to the volumetric change of active material particles, the open area ratio of the holes 9 open on a surface of the negative electrode 1, that is, the percentage of the total area of the holes 9 to the apparent area of the surface is preferably 0.3% to 30%, still preferably 2% to 15%. From the same viewpoint, the holes 9 open on a surface of the negative electrode 1 preferably has a diameter of 5 to 500 μm, still preferably 20 to 100 μm. The pitch of the holes 9 is preferably set at 20 to 600 μm, still preferably 45 to 400 μm, which is effective in assuring sufficient supply of the electrolyte into the active material layer and achieving effective relaxation of the stress due to the volumetric change of active material particles 7. The average number of the holes per arbitrary 1 cm-side square visual field on a surface of the negative electrode 1 is preferably 100 to 250,000, still preferably 1,000 to 40,000, particularly preferably 5,000 to 20,000.

The individual holes 9 may go through the thickness of the negative electrode 1. Nevertheless, considering that the functions of the holes 9 are to supply sufficient electrolyte into the active material layer and to relax the stress arising from the volumetric change of the active material particles, the holes 9 do not have to go through the thickness of the negative electrode 1. It suffices that the holes 9 are open on a surface of the negative electrode 1 and reach at least the active material layer 5.

The negative electrode 1 of the above-described embodiment can be produced in accordance with the process shown in FIG. 2. In greater detail, negative electrode precursors are obtained by the steps shown in FIGS. 2(a) to 2(f). Holes 9 are then perforated in the negative electrode precursors by prescribed perforating means. The step of perforating is followed by the steps shown in FIGS. 2(g) and 2(h). The manner of perforating the holes 9 is not limited. For example, the holes 9 can be bored by laser machining or mechanical means such as needles or a perforating punch. Laser machining provides an advantage over the mechanical means in that a negative electrode having satisfactory cycle characteristics and charge/discharge efficiency is obtained easily. The advantage is attributed to the fact that the metallic material melted and resolidified by laser machining covers the surface of the active material particles existing on the inner wall of the holes 9 to protect the particles from being exposed thereby preventing the active material from falling off the inner wall of the holes 9. Laser machining, if adopted, is conducted by irradiating the active material layer 5 with a laser beam after, for example, the step shown in FIG. 2(f). The holes 9 may also be made by sandblasting or by making use of photoresist technology. It is preferred that the holes 9 be formed at an almost regular interval so that electrode reaction may occur uniformly throughout the negative electrode.

Figure 6:
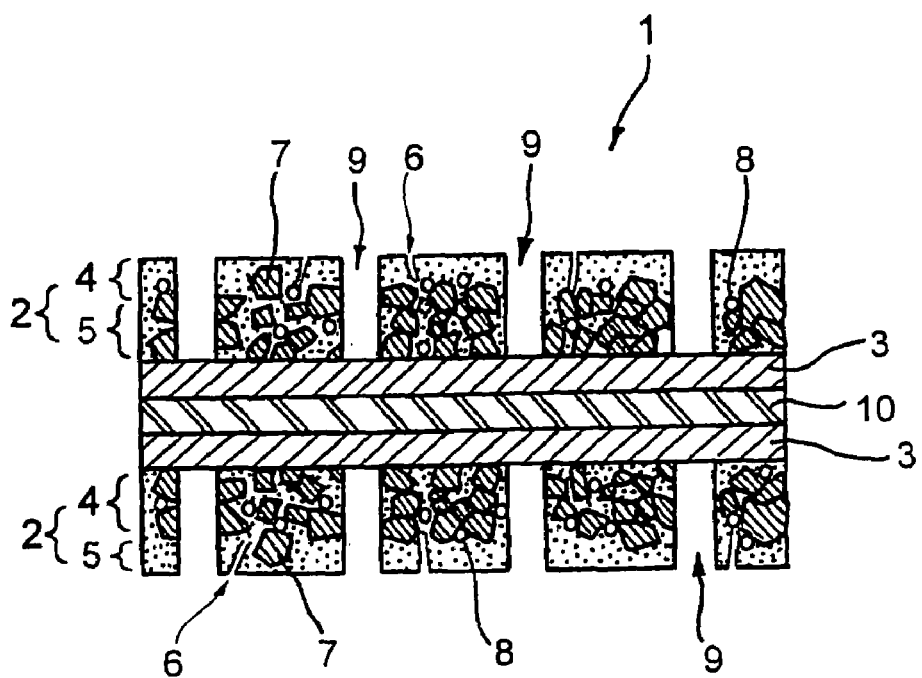
FIG. 6 schematically illustrates the structure of a fifth embodiment of the negative electrode according to the present invention.

The negative electrode 1 shown in FIG. 6 is an example of modification to the negative electrode of FIG. 5. In the negative electrode of FIG. 6, a pair of metallic lithium layers 3 having an electro-conductive foil 10, such as a metal foil, therebetween are sandwiched between a pair of negative electrode precursors 2. The structure of this embodiment produces the same effects as obtained by the negative electrode of FIG. 5 and, in addition, brings about enhanced strength as a negative electrode.

The present invention is not limited to the aforementioned embodiments. For instance, the negative electrodes of the embodiments shown in FIGS. 3 and 4 may have, perforated therein, holes similar to the holes 9 of the negative electrodes of the embodiments shown in FIGS. 5 and 6. The negative electrode shown in FIG. 6 can serve even without the holes 9.

Each of the negative electrodes of the aforementioned embodiments can be used either alone or as stacked one on another. In the latter application, an electro-conductive foil (e.g., a metal foil) that serves as a core can be interposed between adjacent negative electrodes.

While in the aforesaid embodiments each of the paired current collecting surface layers has a single layer structure, at least one of them may have a multilayer structure composed of two or more sublayers. For example, at least one of the surface layers may have a double layer structure composed of a lower sublayer made of nickel (an element having low capability of forming a lithium compound) and an element having high capability of forming a lithium compound and an upper sublayer made of copper (an element having low capability of forming a lithium compound) and an element having high capability of forming a lithium compound. This modification is more effective in preventing the negative electrode from being deformed remarkably due to the volumetric change of the active material. Where a current collecting surface layer has a multilayer structure, at least one of the metallic materials having low capability of forming a lithium compound that can make up the surface layer may be different from the metallic material having low capability of forming a lithium compound that is to penetrate through the active material layer 5. All the metallic materials having low capability of forming a lithium compound, making up the current collecting surface layers, may be different from the metallic material having low capability of forming a lithium compound that is to penetrate through the active material layers 5.

In a case where the material of the current collecting surface layer and the material penetrating the active material layer 5 are different, the metallic material penetrating the active material layer 5 may penetrate up to the boarder between the active material layer 5 and the current collecting surface layer, or pass the boarder to constitute part of the current collecting surface layer. Conversely, the material constituting the current collecting surface layer may pass the boarder and exist in the active material layer 5.

When the operation of depositing a metallic material having low capability of forming a lithium compound throughout the active material layer 5 is carried out using two or more different plating baths, the deposit can take on a multilayer structure composed of two or more different metallic materials.

According to the process shown in FIG. 2, the active material layer 5 is a particulate layer formed by using an electro-conductive slurry containing active material particles. Instead, the active material layer 5 may be a thin film formed by a thin film forming techniques such as chemical vapor deposition, physical vapor deposition, sputtering, and electroplating.

EXAMPLES

The present invention will now be illustrated in greater detail with reference to Examples, but it should be understood that the invention is not deemed to be limited thereto.

Example 1

A negative electrode having the structure shown in FIG. 5 was prepared. An electrolytic copper foil (thickness: 35 µm) was cleaned with an acid solution at room temperature for 30 seconds and then with pure water at room temperature for 30 seconds. The carrier foil was immersed in a tin plating bath having the following composition and electroplated with tin under the conditions of 2 A/dm$^2$ in current density and 30° C. in bath temperature. A tin electrode was used as a cathode, and a direct current source was used. As a result, a discrete coat was deposited with a thickness of 20 nm. The carrier foil was taken out of the plating bath, washed with pure water for 30 seconds, dried in the air, and allowed to stand in the air for 15 minutes to oxidize the coat.

Plating Bath Composition:

| | |
|---|---|
| $SnSO_4$ | 50 g/l |
| $H_2SO_4$ | 100 g/l |
| Cresolsulfonic acid | 100 g/l |

The carrier foil with the coat on was immersed in a 3 g/l CBTA solution kept at 40° C. for 30 seconds to form a release layer. After the treatment, the carrier foil was taken out of the solution and washed with pure water for 15 seconds.

The carrier foil was electroplated as immersed in an $H_2SO_4/CuSO_4$-based plating bath to form a current collecting surface layer of copper on the coated side of the carrier foil. The plating bath contained 250 g/l of $CuSO_4$ and 70 g/l of $H_2SO_4$. The current density was 5 A/dm². The current collecting surface layer was deposited to a thickness of 5 μm. The carrier foil having the surface layer was taken out of the plating bath, washed with pure water for 30 seconds, and dried in the air.

A slurry containing negative electrode active material particles was applied to the current collecting surface layer to a thickness of 20 μm to form an active material layer. The active material particles were Si particles having a median particle size $D_{50}$ of 2 μm. The slurry contained the active material, acetylene black, and styrene-butadiene rubber at a ratio of 98:2:1.7.

The carrier foil, having the active material layer, was immersed in a Watts bath having the composition shown below to carry out penetration plating of the active material with nickel by electrolysis. The current density was 5 A/dm², and the plating bath had a temperature of 50° C. and a pH of 5. A nickel electrode was used as an anode, and a direct current power source was used as a power source. The carrier foil with the plated active material layer was pulled out of the plating bath, washed with pure water for 30 seconds, and dried in the air to give a negative electrode precursor supported on the carrier foil. The scanning electron micrograph of the thus formed negative electrode precursor revealed a great number of micropores formed in the current collecting surface layer.

Plating Bath Composition:

| | |
|---|---|
| $NiSO_4 \cdot 6H_2O$ | 250 g/l |
| $NiCl_2 \cdot 6H_2O$ | 45 g/l |
| $H_3BO_3$ | 30 g/l |

A YAG laser beam was applied to the negative electrode precursor to bear 24 μm diameter holes through the negative electrode precursor regularly at a pitch of 100 μm (10000 holes per square centimeter). The open area ratio was 4.5%.

A separately prepared 30 μm thick metallic lithium foil was sandwiched between a pair of negative electrode precursors thus obtained. The two negative electrode precursors were paired with their active material layers facing each other. Each of the negative electrode precursors and the metallic lithium were thus united. Finally, the carrier foils were peeled off the current collecting surface layers to give a desired negative electrode. The amount of metallic lithium in the negative electrode was 30% of the theoretical initial charge capacity of the negative electrode active material.

A nonaqueous secondary battery was assembled using the resulting negative electrode as follows. The battery was evaluated in discharge capacity after one cycle, rate of change in thickness, and capacity retention after 100 cycles in accordance with the following methods. The results of evaluation are shown in Table 1.

Preparation of Nonaqueous Secondary Battery:

The negative electrode obtained above and $LiCoO_2$ were used as a working electrode and a counter electrode, respectively. The counter electrode was prepared by applying $LiCoO_2$ to a 20 μm thick aluminum foil so as to have a capacity of 4 mAh/cm². The positive to negative electrode capacity ratio was 1:2. The electrodes were placed to face each other with a separator between them and assembled into a nonaqueous secondary battery in a usual manner using an $LiPF_6$ solution in a mixture of ethylene carbonate and diethyl carbonate (1:1 by volume) as a nonaqueous electrolyte.

Discharge Capacity after One Cycle:
The discharge capacity per unit area of the negative electrode was measured.

Rate of Change in Thickness:
The change of the negative electrode in thickness with a charge in the first cycle was obtained by measuring a change in total thickness of the negative electrode, the separator and the positive electrode ($LiCoO_2$) with a displacement sensor (HS Cell, available from Hohsen Corp.). Since the positive electrode expands little with a charge and a discharge, the change of the total thickness is mostly ascribed to the thickness change of the negative electrode. Accordingly, the measured thickness change is substantially regarded as the change of the negative electrode.

Capacity Retention after 100 Cycles:
The discharge capacity after 100 cycles was measured. The measured value was divided by the maximum negative electrode discharge capacity, and the quotient was multiplied by 100 to give the capacity retention after 100 cycles.

Comparative Example 1

A negative electrode was obtained in the same manner as in Example 1, except that a metallic lithium foil was not used, so that a pair of negative electrode precursors were united with their active material layers facing each other directly. The resulting negative electrode was evaluated in the same manner as in Example 1. The results obtained are shown in Table 1.

TABLE 1

| | Example 1 | Comparative Example 1 |
|---|---|---|
| Hole Diameter (μm) | 24 | 24 |
| Pitch (μm) | 100 | 100 |
| Open Area Ratio (%) | 4.5 | 4.5 |
| Hole Density | 10000 | 10000 |
| Discharge Capacity after the 1st Cycle (mAh/cm²) | 8 | 8 |
| Rate of Change in Negative Electrode Thickness (%) | 3 | 10 |
| Capacity Retention after 100 Cycles (%) | 98 | 85 |

It is clearly seen from the results in Table 1 that the battery using the negative electrode of Example 1 exhibits a high discharge capacity and capacity retention and a small change in negative electrode thickness. In contrast, the battery using the negative electrode of Comparative Example 1 having no lithium foil undergoes a great change in negative electrode thickness and has a low capacity retention.

Examples 2 to 4 and Comparative Example 2

The influences of the amount of metallic lithium present in a negative electrode on the negative electrode performance were examined as follows. Negative electrodes were prepared in the same manner as in Example 1, except that YAG laser machining was not carried out on the negative electrode precursors and that the amount of metallic lithium was changed as shown in Table 2. FIG. 1 shows the structure of the negative electrodes obtained in Examples 2 to 4. Existence of a great number of micropores in the current collecting surface layers was confirmed by electron microscopic observation.

The resulting negative electrodes were evaluated for charge and discharge capacities after the 1st cycle. The results obtained are shown in Table 2. In Table 2 is also shown capacity reversibility (%) after the 1st cycle, which is calculated by dividing the discharge capacity after the 1st cycle by the charge capacity after the 1st cycle and multiplying the quotient by 100. In the measurements, metallic lithium was used as a counter electrode, which allowed for estimating mainly the irreversible capacity of the negative electrode, without including that of the counter electrode. Furthermore, since the negative electrode capacity is not restricted by the counter electrode, the entire negative electrode capacity is discharged and recharged.

TABLE 2

| | Amount of Metallic Li (%*) | Charge Capacity after the 1st Cycle (mAh) | Discharge Capacity after the 1st Cycle (mAh) | Capacity Reversibility after the 1st Cycle (%) |
|---|---|---|---|---|
| Example 2 | 10 | 8 | 7.98 | 99.8 |
| Example 3 | 20 | 8 | 8.88 | 111.0 |
| Example 4 | 30 | 8 | 10.4 | 130.0 |
| Compara. Example 2 | 0 | 8 | 7.16 | 89.6 |

*Percentage to the theoretical initial charge capacity of Si

As is apparent from the results in Table 2, it is seen that each of the negative electrodes of Examples 2 to 4 has a higher capacity reversibility after the 1st cycle than that of Comparative Example 2. This is thought to be because the metallic lithium present in the negative electrode of Examples removes water that adversely affects the performance of the negative electrode and also traps oxygen. The reason the capacity reversibility after the 1st cycle in Examples 3 and 4 exceeds 100% is because the previously added metallic lithium contributes to the charge/discharge reaction.

Examples 5 and 6 and Comparative Examples 3 and 4

The influences of water content of a negative electrode on the performance of the negative electrode was examined as follows. Negative electrodes were prepared in the same manner as in Example 1, except that YAG laser machining was not carried out on the negative electrode precursors and that the amount of metallic lithium was changed to 40% of the theoretical initial charge capacity of silicon. The structure of the resulting negative electrodes is shown in FIG. 1. Existence of a great number of micropores in the current collecting surface layers was confirmed by electron microscopic observation. The negative electrode was dried in a vacuum chamber at 160° C. for one week or 3 hours to reduce the water content to 390 ppm (Example 5) or 870 ppm (Example 6), respectively.

Separately, the negative electrode obtained in Comparative Example 2 was dried in a vacuum chamber at 160° C. for one week or 3 hours to reduce the water content to 390 ppm (Comparative Example 3) or 870 ppm (Comparative Example 4), respectively.

Figure 7:
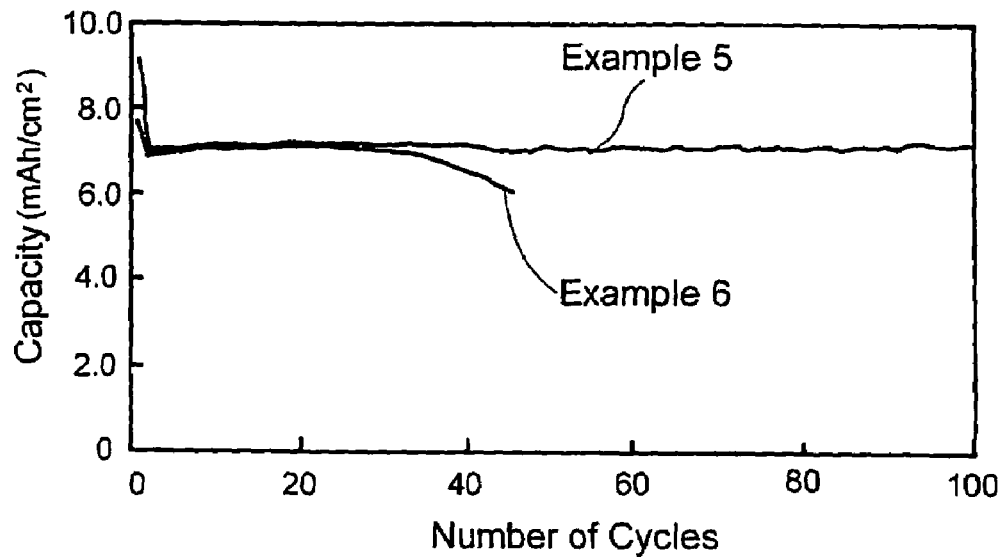
FIG. 7 graphically represents charge/discharge characteristics of batteries using the negative electrodes obtained in Examples 5 and 6.
Figure 8:
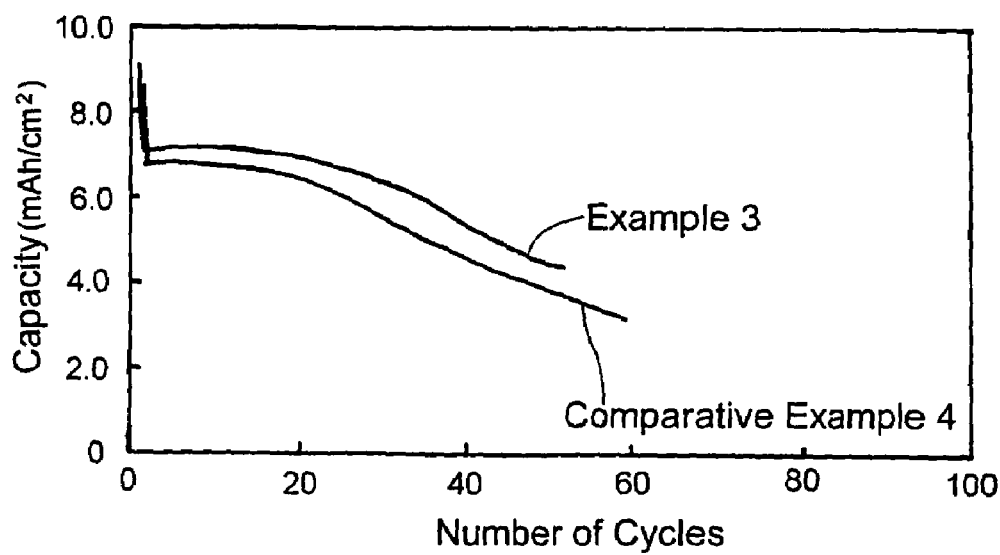
FIG. 8 graphically represents charge/discharge characteristics of batteries using the negative electrodes obtained in Comparative Examples 3 and 4.

A battery was assembled using each of the resulting negative electrodes, and the cycle characteristics of the battery were evaluated. The results are shown in FIGS. 7 and 8. The battery of Example 5 was tested up to the 100th cycle, and the other batteries were tested up to the 50th cycle. LiCoO$_2$ applied to a 20 μm thick aluminum foil was used as a counter electrode. An LiPF$_6$ solution in a 1:1 (by volume) mixed solvent of ethylene carbonate and dimethyl carbonate was used as a nonaqueous electrolyte. The charge/discharge conditions were as follows.

1) Initial charge: constant current/constant voltage mode; current density, 0.4 mA/cm$^2$; cut-off, 4.15 V, 0.04 mA/cm$^2$ 2) Charge in 2nd cycle et seq: constant current mode; current density, 1.0 mA/cm$^2$; cut-off, 3.95 V 3) First discharge: constant current/constant voltage mode; current density, 0.4 mA/cm$^2$; cut-off, 2.7 V 4) Discharge in 2nd cycle et seq: constant current mode; current density, 1.0 mA/cm$^2$; cut-off, 2.7 V It is apparently seen from FIGS. 7 and 8 that the negative electrodes of Examples 5 and 6 do not show capacity reduction even after repetition of charge and discharge cycles. In contrast, the negative electrodes of Comparative Examples 3 and 4 undergo gradual reduction in capacity with charge and discharge cycles.

Example 7 and Comparative Example 5

The influence of oxygen in a negative electrode on the performance of the negative electrode were examined as follows. The negative electrode obtained in Example 5 (water content: 390 ppm) was oxidized by heat treatment in the air to increase the oxygen concentration to 4000 ppm (Example 7). On the other hand, the negative electrode obtained in Comparative Example 4 was further dried to reduce the water content to 390 ppm and then oxidized by heat treatment in the air to increase the oxygen concentration to 4000 ppm (Comparative Example 5).

Figure 9A:
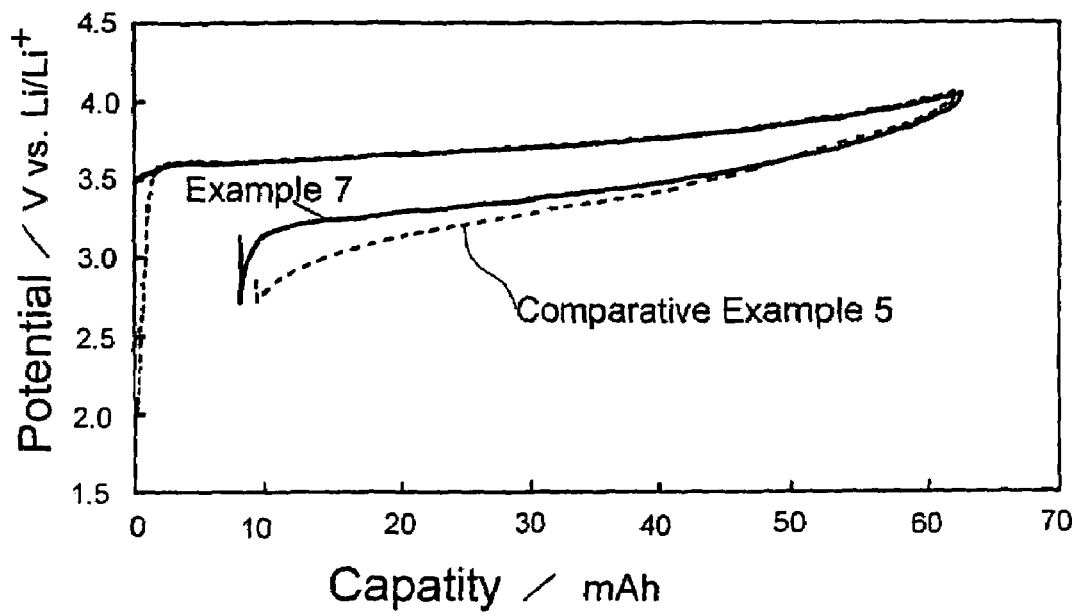
FIGS. 9(*a*) and 9(*b*) graphically represent charge/discharge characteristics of batteries using the negative electrodes obtained in Example 7 and Comparative Example 5, respectively.
Figure 9B:
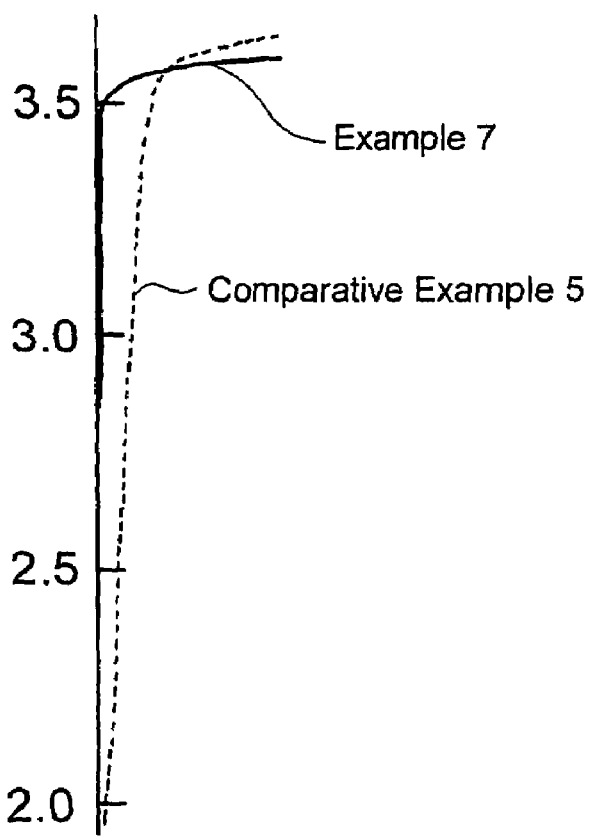

The charge/discharge characteristics of the negative electrodes obtained in Example 7 and Comparative Example 5 were evaluated, and the results are shown in FIG. 9(a). FIG. 9(b) is an enlargement of the initial rising part of the charge/discharge curves of FIG. 9(a). As is apparent from the results shown in FIGS. 9(a) and 9(b), especially FIG. 9(b), the curve of the negative electrode of Comparative Example 5 depicts a shoulder characteristic of an oxidized negative electrode, whereas such a shoulder disappears in the case of the negative electrode of Example 7. This difference is considered to be because the metallic lithium previously existing in the negative electrode of Example 7 has trapped oxygen.

As described hereinabove, the negative electrode of the present invention can have lithium leached out of the metallic lithium layer and supplied when lithium is consumed during charging and discharging. This settles the so-called "lithium depletion problem" that is of concern where a battery is designed to have a reduced amount (capacity) of a positive electrode active material as compared with the amount (capacity) of a negative electrode active material. As a result, the initial irreversible capacity can be reduced, and the charge/discharge efficiency (cycle characteristics) in every charge/discharge cycle can be improved. Moreover, since the active material has intercalated lithium before the start of a charge/discharge cycle, a volumetric increase ascribed to lithium intercalation during charging can be reduced, which makes great contribution to improvement of a cycle life.

Even where members making up a battery including a negative electrode contain a trace amount of water or oxygen, the metallic lithium reacts with water or oxygen to consume and reduce the water or oxygen content in the battery. This also brings about reduction in initial irreversible capacity and improvement on charge/discharge efficiency in each charge/discharge cycle (cycle characteristics).

After lithium leaches out, spaces are left in the metallic lithium layer. The spaces relax the stress attributed to the expansion/contraction of the active material during charge/discharge whereby the active material is prevented from pulverizing. Even though the pulverization of the active material proceeds, since the active material is not exposed on the surface of the electrode but buried inside the electrode, fall-off of the active material is prevented to secure the current collecting capabilities of the active material against repetition of charge and discharge cycles. Moreover, since the metallic lithium layer is not exposed on the surface but positioned inside the negative electrode, it is inhibited from forming lithium dendrites.

The invention claimed is:

1. A negative electrode for a nonaqueous secondary battery, comprising:
   a pair of current collecting surface layers;
   an active material layer located between the current collecting surface layers; and
   a metallic lithium layer located between the current collecting surface layers.

2. The negative electrode for a nonaqueous secondary battery according to claim 1, further comprising:
   two negative electrode precursors, each having the current collecting surface layer and the active material layer disposed on one side of the current collecting surface layer, the metallic lithium layer being interposed between the negative electrode precursors with the active material layers of the negative electrode precursors facing each other and with the current collecting surface layers facing outward.

3. The negative electrode for a nonaqueous secondary battery according to claim 1, wherein at least one of the current collecting surface layers has a number of micropores open on the surface thereof, extending in the thickness direction thereof and being penetrable to a nonaqueous electrolyte.

4. The negative electrode for a nonaqueous secondary battery according to claim 3, wherein the micropores have an average open area of 0.1 to 50 $\mu m^2$ and an open area ratio of 0.1 to 20%.

5. The negative electrode for a nonaqueous secondary battery according to claim 1, further comprising:
   a metallic material having low capability of forming a lithium compound penetrating through a whole thickness of the active material layer, so as to perform current collecting function as a whole.

6. The negative electrode for a nonaqueous secondary battery according to claim 1, wherein the active material layer is formed by applying an electro-conductive slurry containing a particulate active material having high capability of forming a lithium compound.

7. The negative electrode for a nonaqueous secondary battery according to claim 1, wherein the active material layer is a thin layer of an active material having high capability of forming a lithium compound formed by a thin film formation technique.

8. The negative electrode for a nonaqueous secondary battery according to claim 1, wherein the current collecting surface layers are each formed by electroplating.

9. The negative electrode for a nonaqueous secondary battery according to claim 1, wherein the current collecting surface layers each comprise a metallic material having low capability of forming a lithium compound.

10. A negative electrode for a nonaqueous secondary battery, comprising:
    a pair of current collecting surface layers comprising a metallic material having low capability of forming a lithium compound and an active material layer between the current collecting surface layers,
    at least one of the current collecting surface layers having a number of micropores open on the surface thereof, extending in the thickness direction thereof and being penetrable to a nonaqueous electrolyte,
    the active material layer containing a particulate active material which has high capability of forming a lithium compound and in which lithium is intercalated,
    the active material layer having a metallic material having low capability of forming a lithium compound penetrating through the whole thickness thereof, and
    the negative electrode having no electro-conductive metal foil layer as a core.

11. The negative electrode for a nonaqueous secondary battery according to claim 10, wherein the micropores have an average open area of 0.1 to 50 $\mu m^2$ and an open area ratio of 0.1 to 20%.

12. The negative electrode for a nonaqueous secondary battery according to claim 10, wherein the current collecting surface layers are each formed by electroplating.

13. A negative electrode for a nonaqueous secondary battery, comprising:
    a pair of current collecting surface layers comprising a metallic material having low capability of forming a lithium compound; and
    an active material layer between the current collecting surface layers,
    at least one of the current collecting surface layers having a number of micropores open on the surface thereof, extending in the thickness direction thereof and being penetrable to a nonaqueous electrolyte,
    the active material layer containing a particulate active material which has high capability of forming a lithium compound, and the active material layer in an uncharged state being intercalated with lithium,
    the active material layer having a metallic material having low capability of forming a lithium compound penetrating through the whole thickness thereof, and
    the negative electrode having an electro-conductive metal foil layer as a core.

* * * * *